Sept. 28, 1948.　　　F. R. HENSEL　　　2,450,339
METHOD OF MAKING POROUS METAL FILTERS
Filed Sept. 17, 1943
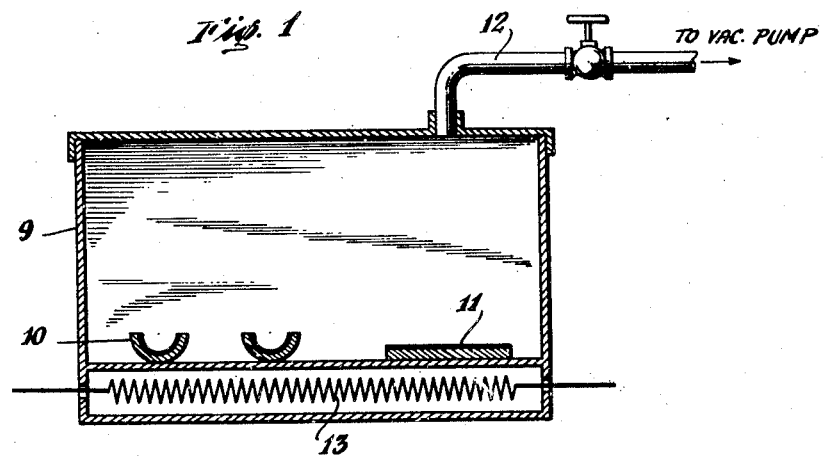
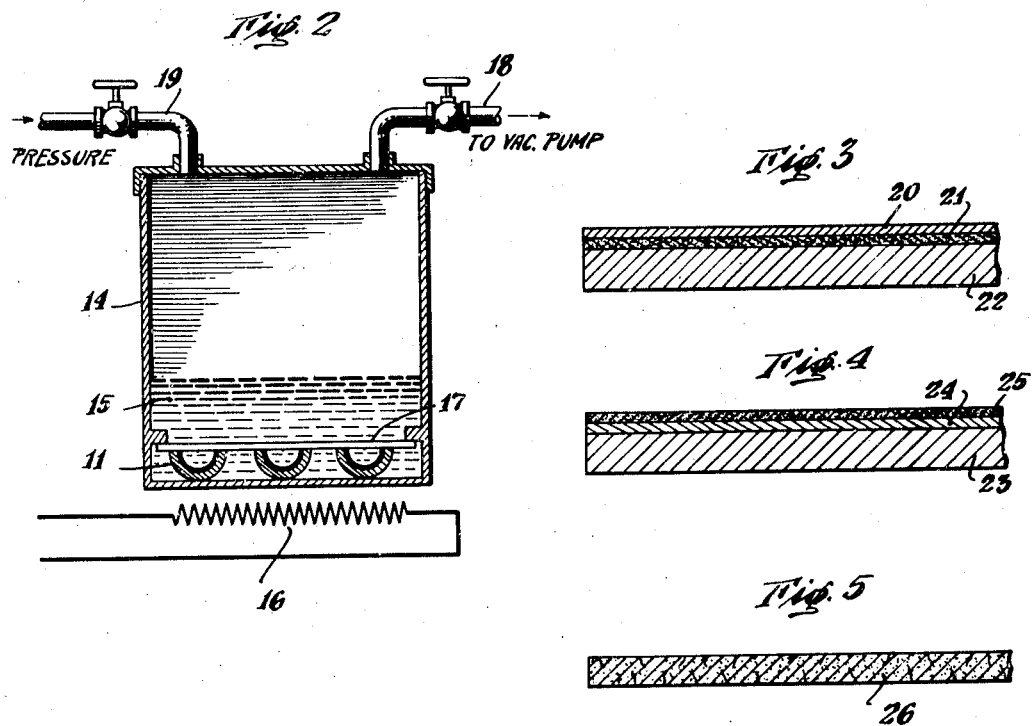
INVENTOR.
Franz R. Hensel
BY Robbins + Carlson
ATTORNEYS Patented Sept. 28, 1948

2,450,339

UNITED STATES PATENT OFFICE 2,450,339

METHOD OF MAKING POROUS METAL FILTERS

Franz R. Hensel, Indianapolis, Ind., assignor to P. R. Mallory & Co., Inc., Indianapolis, Ind., a corporation of Delaware Application September 17, 1943, Serial No. 502,740

3 Claims. (Cl. 29—148)

This invention relates to a process for making porous or impregnated metal layers.

An object of the invention is to improve the methods of making porous metal bodies.

Another object is to improve bearings and their manufacture.

A further object is to improve porous metal bodies such as electrolytic condenser electrodes, filters and the like.

Other objects of the invention will be apparent from the description and claims.

In the drawings:

Figure 1 illustrates a vacuum apparatus for making a porous metal body;

Figure 2 shows a method of impregnating the body;

Figure 3 illustrates a step in another impregnation method;

Figure 4 illustrates a bearing of modified form; and

Figure 5 shows a section through a porous metal sheet.

A feature of the present invention resides in producing an alloy or metal composition containing a solid metal of low boiling point, such as zinc or cadmium, and subsequently evaporating the low boiling metal to leave a porous metal body. It is also contemplated that the alloy may be worked, rolled and formed into the desired shape prior to evaporation. It is further contemplated that the pores produced by evaporation may be subsequently impregnated with another metallic or non-metallic material.

An important application of the process is in the manufacture of bearing materials.

The preparation of copper-lead bearing alloys in the form of a bimetallic strip has presented fabrication difficulties which have not been overcome as yet. A large number of patents have been taken out which describe methods of producing such strip, starting with powdered metals followed by an impregnation process. The structure, however, is extremely weak and therefore the bearings have a tendency to fail in fatigue. Furthermore, difficulties have been encountered in trying to obtain a bond of a copper-lead alloy to steel. The lead has a tendency to segregate in the bond, thereby weakening it.

According to the present invention a steel-brass overlay metal is produced by well known methods such as brazing, fusing the brass directly to the steel, plating, spraying, hot rolling the metals together, etc., and is rolled down to practically finished dimensions. It may then appear as a clad metal sheet or a lined bearing shell or half-shell. The thickness of the brass may be between a few thousandths of an inch and 25 to 50 thousandths.

The composite metal body thus formed is placed in a vacuum chamber 9 as shown in Figure 1, where bearing half-shells 10 and a piece of overlay metal sheet 11 are shown in the chamber preparatory to treatment. The vacuum pump is started to evacuate the chamber through pipe 12. The bodies are then heated, as by resistance heating element 13, to the vaporization temperature of the zinc at the reduced pressure but below the melting point of the brass, for example 700–850° C. This results in the vaporization of the zinc providing a honeycomb structure of extremely fine micro-porosity.

For use as a bearing the pores are filled with an anti-friction material such as oil or lead, indium, thallium, babbitt, or other lubricant metals.

Figure 2 shows a method for impregnating with lead or other metal. The bearing blanks 11 having the porous copper surface resulting from evaporation of the zinc from the brass layer are placed in chamber 14 and covered with a bath 15 of molten lead, or other lubricant. A heater 16 maintains the bath temperature, and rack 17 holds the parts under the bath. Alternate vacuum and pressure are applied to the bath through pipes 18 and 19, respectively, to remove gases and promote entry of the lubricant into the pores. It is contemplated that the impregnation may be carried out in the evaporation chamber, if desired.

The original bond between the brass and the steel backing is not adversely affected by the vaporization process. The porous structure itself is extremely strong due to the fact that it is created from a previously fused alloy, the structure of such alloy being of the solid solution type where the crystal lattice structure is composed of alternate atoms of copper and zinc for instance.

It is contemplated that silver, gold, platinum, palladium and aluminum base bearings may also be made by this process, substituting silver-zinc or aluminum-zinc alloys, for example, for the brass. Other low boiling metals may in some cases be substituted for the zinc, such as cadmium.

In Table I the vapor pressures of zinc and cadmium are given as a function of temperature while in Table 2 the vapor pressures of such metals as copper, silver and aluminum are shown for comparison.

Table I

*Vapor pressure of zinc*

| | | | |
|---|---|---|---|
| 256.8° C | .00012 | m./m. | solid |
| 419.4° C | .15 | m./m. | melting point |
| 588.8° C | 9.051 | m./m. | liquid |
| 720.4° C | 81.42 | m./m. | liquid |
| 836.0° C | 356.2 | m./m. | liquid |
| 905.0° C | 760 | m./m. | liquid |

*Vapor pressure of cadmium*

| | | | |
|---|---|---|---|
| 198.7° | .00027 | m./m. | solid |
| 302.9 | .102 | m./m. | melting point |
| 570.8 | 51.81 | m./m. | liquid |
| 706.7 | 371.3 | m./m. | liquid |
| 765.9 | 760.0 | m./m. | liquid |

Table II

*Vapor pressure of silver*

| | | | |
|---|---|---|---|
| 1178° C | .144 | m./m. | liquid |
| 1435° C | 3.9 | m./m. | liquid |
| 1660° C | 102 | m./m. | liquid |
| 1780° C | 263 | m./m. | liquid |
| 1955° C | 706 | m./m. | liquid |

*Vapor pressure of copper*

| | | | |
|---|---|---|---|
| 1875° C | 20 | m./m. | liquid |
| 1980° C | 100 | m./m. | liquid |
| 2215° C | 300 | m./m. | liquid |
| 2310° C | 760 | m./m. | liquid |

*Vapor pressure of aluminum*

| | | | |
|---|---|---|---|
| 1203° C | .01 | m./m. | liquid |
| 1400° C | .23 | m./m. | liquid |
| 1700° C | 10 | m./m. | liquid |
| 1964° C | 100.6 | m./m. | liquid |
| 2270° C | 760 | m./m. | liquid |

It will be noted that the boiling points of zinc (905° C.) and cadmium (765.9° C.) at atmospheric pressure are below the melting point of copper (1083° C.) although some of the brasses melt at lower temperatures, even as low as 905° C. The melting point of silver (960.5° C.) is closer to the boiling point of zinc and that of aluminum (669.7° C.) is below the boiling points of both zinc and cadmium. Vaporization should be carried on at temperatures below the melting points of the starting alloys and the residual metal. It is clear that a vacuum process is preferable as it permits fairly rapid volatilization of the zinc or cadmium at lower temperatures. The degree of vacuum need not be extremely high as effective results can be obtained at ¼ to ½ atmospheric pressure and even at higher pressures. In fact with the higher melting point alloying metals such as copper it is possible to work at atmospheric pressure by carefully regulating the temperature to maintain it as high as possible without melting the layer. As the zinc and cadmium is removed it is also possible to raise the temperature toward the end of the volatilization period. Vaporization should preferably be carried out in a neutral or reducing gas atmosphere to prevent oxidation of the porous layer.

Since the zinc and cadmium have substantial vapor pressures even below their boiling points under the pressures used it is not always necessary to reach the boiling points of these metals. A substantial removal of these metals is obtained below their boiling points if the time of treatment is prolonged.

It is evident that there is a considerable difference of vapor pressures for these two different classes of metals for a given temperature. Comparing cadmium and silver for instance, we find that cadmium will have a strong tendency to vaporize at 600° C. while the vapor pressure of silver is so low at 600° C. that it cannot be measured. It would be necessary in the case of silver to go to 1800° C. to obtain a similar rate of vaporization.

These tables also indicate the degree of vacuum necessary to cause vaporization. The higher the vapor pressure the lower may be the vacuum to accomplish vaporization. The tables therefore show that more vacuum equipment is required if the vaporization process is to be carried out at lower temperatures.

In the case of silver I have found that silver cadmium alloys are particularly useful since they can be worked easily and since cadmium has a high vapor pressure facilitating evaporation.

Another method of impregnating comprises applying a layer 20 of lead or other lubricant metal over the porous copper or other porous metal layer 21 which is bonded to backing layer 22 of steel, nickel or other strong backing material as shown in Figure 3. Layer 20 may be sprayed onto layer 21, electroplated, or merely laid on as a sheet or in the form of powder. The assembly is then heated, preferably in a neutral or reducing atmosphere to bring about impregnation and diffusion of the metal of layer 20 into layer 21.

The amount of porosity can be controlled by selecting the proper amount of low boiling point elements in the alloy. In the case of brasses we have rather wide limits within which the invention may be practiced. It is possible to use zinc contents as low as several percent and as high as 40 percent. If it is desired to obtain a continuous network of micro-porosity the limits of zinc will be in the neighborhood of 15 to 20%.

Instead of using binary alloys of only one low boiling point constituent complex alloys containing several low boiling point metals can be used such as silver base alloys containing both zinc and cadmium.

The porosity of the alloys can also be controlled by properly correlating thickness of sheet, temperature at which evaporation is carried out, time, degree of vacuum. The evaporation process relies upon diffusion of the low boiling point metals from the center of the sheet to the surface where evaporation takes place. While in some cases it is desired to eliminate the low boiling point metal entirely there are other cases where only partial elimination is required.

During the evaporation process the low boiling metal is eliminated from the surface layers first. It is therefore possible to stop the evaporation process at an intermediate stage to leave a porous surface layer backed by the original alloy, such as brass. The porous surface layer may be impregnated with a lubricant such as oil, lead or thallium to produce a bearing.

Figure 4 shows such a bearing body comprising a steel backing 23, an intermediate brass layer 24 and a bearing surface layer 25 of porous copper impregnated with lead or the like.

Figure 5 shows a cross section of a porous sheet 26 formed by evaporating the zinc or cadmium from an alloy sheet to leave it porous throughout its thickness.

Such a sheet can be used in bearing manufacture by brazing it to a backing, electroplating a backing onto the sheet or by other methods. It may be formed of porous aluminum, copper, silver or other bearing metals.

Electrolytic condensers are made of aluminum foil .00025 to .005 inch thick which is placed in contact with an electrolyte which forms a very thin insulating film on the aluminum surface. The capacity of the condenser depends upon the microscopic surface area of the aluminum. For this reason aluminum foil is often etched or roughened to increase its capacity. It is contemplated that a high capacity foil can be made by the present process using an alloy foil of aluminum-zinc, aluminum-cadmium or aluminum-cadmium-zinc. The foil is heated in a vacuum according to the process already described to vaporize the zinc or cadmium and leave a micro-porous aluminum sheet, which may also be represented by Figure 5.

In the case of aluminum-zinc alloys the boiling point of aluminum is 1800° C. while that of zinc is 905° C. However, aluminum melts at 660° C. and this melting point is further reduced in an aluminum-zinc alloy. A 12% zinc alloy melts at about 600° C. By heating the foil in a comparatively high vacuum to 500° C. the evaporation of the zinc is started. The temperature can then gradually be raised to 600° C. as most of the zinc is eliminated so that the foil is kept below its melting point at all times.

The porous aluminum foil produced by this method is film-formed and used as electrodes for electrolytic condensers.

Micro-porous metal filters can be made in a similar manner. In this case precious and semi-precious metals are alloyed with zinc or other volatile metal, the alloy rolled into a thin foil preferably .00025 to .050 inch thick and heated to volatilize the low boiling constituent. Gold, platinum or palladium are preferred for highly corrosive applications. For less severe use nickel-silvers may be used which generally consist of copper, nickel and zinc. The zinc is vaporized and a micro-porous corrosion resistant cupro-nickel is retained.

While specific embodiments of the invention have been described, it is intended to cover the invention broadly within the spirit and scope of the appended claims.

What is claimed is:

1. The method of making a micro-porous metal filter which comprises providing a thin sheet of a dense and non-porous alloy of a low boiling metal selected from the group consisting of cadmium and zinc and of at least one higher boiling metal, heating the sheet in a non-oxidizing atmosphere and under reduced pressure to the vaporization temperature of the low boiling metal but below the melting point of the alloy, and maintaining said sheet at said temperature and pressure until a substantial proportion of said low boiling metal is removed therefrom and a continuous network of minute filtering pores is provided therein.

2. The method of making a micro-porous metal filter which comprises forming a dense and non-porous alloy of a low boiling metal and a higher boiling corrosion resistant metal, rolling the alloy into a thin sheet, heating the said alloy sheet to a temperature near to but below its melting point to vaporize the low boiling metal, raising the temperature to a slightly higher value as the composition of the alloy changes, and maintaining the temperature at such value until a sufficient proportion of low boiling metal is removed from the alloy to produce a continuous network of minute filtering pores in the sheet.

3. The method of making a micro-porous metal filter which comprises providing a dense and non-porous alloy of a low boiling metal selected from the group consisting of cadmium and zinc and of at least one higher boiling metal, rolling said alloy into a relatively thin sheet, heating the sheet in a non-oxidizing atmosphere and under reduced pressure to the vaporization temperature of the low boiling metal but below the melting point of the alloy, and maintaining said sheet at said temperature and pressure until a substantial proportion of said low boiling metal is removed therefrom and a continuous network of minute filtering pores is provided therein.

FRANZ R. HENSEL.

REFERENCES CITED

The following references are of record in the file of this patent:

UNITED STATES PATENTS

| Number | Name | Date |
| --- | --- | --- |
| 930,723 | Von Bolton | Aug. 10, 1909 |
| 1,026,343 | Coolidge | May 14, 1912 |
| 1,026,344 | Coolidge | May 14, 1912 |
| 1,026,429 | Coolidge | May 14, 1912 |
| 1,628,190 | Raney | May 10, 1942 |
| 2,178,529 | Calkins et al. | Oct. 31, 1939 |
| 2,192,792 | Kurtz | Mar. 5, 1940 |
| 2,239,144 | Dean et al. | Apr. 22, 1941 |
| 2,241,095 | Marvin | May 6, 1941 |
| 2,267,918 | Hildabolt | Dec. 30, 1941 |
| 2,273,589 | Olt | Feb. 17, 1942 |
| 2,299,877 | Calkins | Oct. 27, 1942 |
| 2,301,756 | Shutt | Nov. 10, 1942 |
| 2,319,240 | Larsen | May 18, 1943 |
| 2,321,805 | Koehring | Aug. 24, 1943 |
| 2,409,295 | Marvin | Oct. 15, 1946 |

FOREIGN PATENTS

| Number | Country | Date |
| --- | --- | --- |
| 194,355 | Great Britain | Mar. 12, 1923 |